(12) United States Patent
Tanabe et al.

(10) Patent No.: US 12,523,723 B2
(45) Date of Patent: Jan. 13, 2026

(54) SUPERCONDUCTING MAGNET AND MRI APPARATUS

(71) Applicant: CANON MEDICAL SYSTEMS CORPORATION, Otawara (JP)

(72) Inventors: Hajime Tanabe, Okayama (JP); Ryo Eguchi, Ako (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 163 days.

(21) Appl. No.: 18/439,927

(22) Filed: Feb. 13, 2024

(65) Prior Publication Data

US 2024/0280655 A1 Aug. 22, 2024

(30) Foreign Application Priority Data

Feb. 17, 2023 (JP) .................. 2023-023306

(51) Int. Cl.
*G01R 33/38* (2006.01)
*G01R 33/3815* (2006.01)

(52) U.S. Cl.
CPC ................. *G01R 33/3815* (2013.01)

(58) Field of Classification Search
CPC ............. G01R 33/3815; G01R 33/288; G01R 33/56518; G01R 33/3804
See application file for complete search history.

(56) References Cited

U.S. PATENT DOCUMENTS

2016/0281933 A1* 9/2016 Ham .................. F17C 13/001
2020/0355769 A1* 11/2020 Amthor ............. G01R 33/3858

FOREIGN PATENT DOCUMENTS

JP 2016-538920 A 12/2016

* cited by examiner

*Primary Examiner* — G.M. A Hyder
(74) *Attorney, Agent, or Firm* — Oblon, McClelland, Maier & Neustadt, L.L.P.

(57) ABSTRACT

In one embodiment, a superconducting magnet configured to be used in an MRI apparatus that includes a gradient coil. The superconducting magnet comprising a helium vessel, a vacuum vessel, and a heat shield. Among components constituting the heat shield, at least a component of a portion facing the gradient coil is composed by superimposing two layers of metallic materials, the two layers being a first shield layer and a second shield layer. The first shield layer is disposed in such a manner that distance between the gradient coil and the first shield layer is shorter than distance between the gradient coil and the second shield layer, and a metallic material forming the first shield layer is higher in electrical conductivity than a metallic material forming the second shield layer.

10 Claims, 6 Drawing Sheets

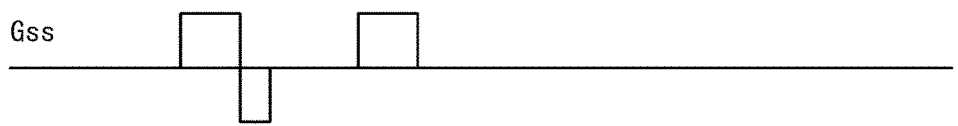
FIG. 4A  Gss
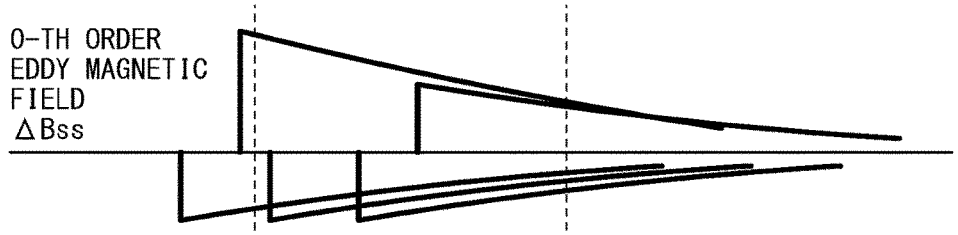
FIG. 4B  0-TH ORDER EDDY MAGNETIC FIELD ΔBss
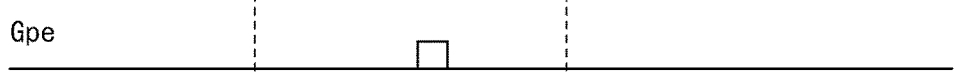
FIG. 4C  Gpe
FIG. 4D  0-TH ORDER EDDY MAGNETIC FIELD ΔBpe
FIG. 4E  Gro
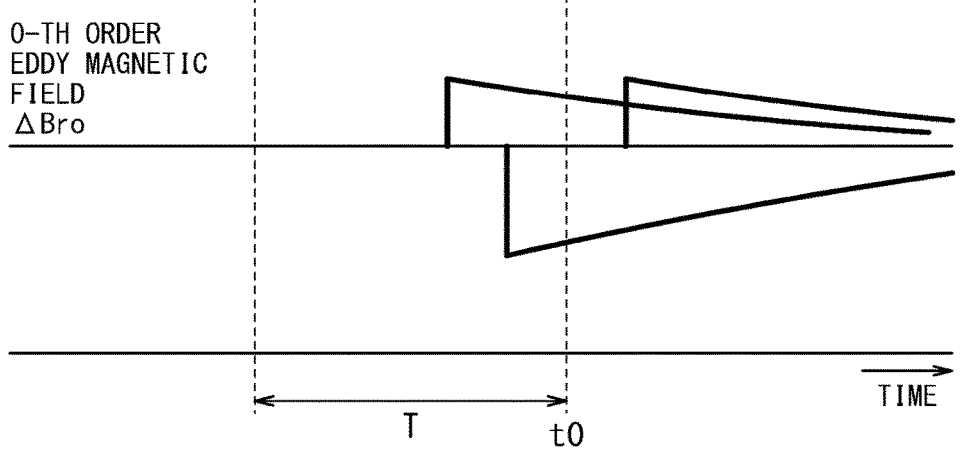
FIG. 4F  0-TH ORDER EDDY MAGNETIC FIELD ΔBro

SUPERCONDUCTING MAGNET AND MRI APPARATUS

CROSS-REFERENCE TO RELATED APPLICATION

This application claims the benefit of priority of Japanese Patent Application No. 2023-023306, filed on Feb. 17, 2023, the entire contents of which are incorporated herein by reference.

TECHNICAL FIELD

Disclosed Embodiments relate to a superconducting magnet and a magnetic resonance imaging (MRI) apparatus.

BACKGROUND

An MRI apparatus is an imaging apparatus that magnetically excites nuclear spin of an object placed in a static magnetic field by applying a radio frequency (RF) pulse having the Larmor frequency and reconstructs an image based on magnetic resonance (MR) signals emitted from the object due to the excitation.

A superconducting magnet and/or a permanent magnet is used as a static magnetic field magnet in an MRI apparatus, for example. The superconducting magnet for an MRI apparatus includes a helium vessel that contains a superconducting coil for generating a strong magnetic field, a heat shield (also called a radiation shield) configured to reduce heat intrusion into the helium vessel due to radiant heat, and a vacuum vessel configured to thermally insulate the inside of the superconducting magnet by vacuum, for example.

The superconducting coil may cause a quench due to, for example, an electrical trouble and/or some sort of disturbance that occurs within the coil. When a quench occurs, significantly large electromagnetic force acts within the heat shield due to the induced current generated in the heat shield. Thus, in order to suppress damage to the heat shield ascribable to this electromagnetic force, a suppression means such as additional mechanical reinforcement to the heat shield is required in some cases.

Furthermore, during imaging by the MRI apparatus, eddy currents are generated in the heat shield due to the operation of the gradient coil. The eddy currents generated in the heat shield form eddy-current magnetic fields that affect the imaging space, and thus, the eddy currents adversely affect image quality of MR images in some cases.

A non-magnetic metallic material is generally used for forming the heat shield, but there are conflicting requirements regarding electrical conductivity of the metallic materials forming the heat shield between the case of imaging by an MRI apparatus and the case where the superconducting coil is quenched. It is difficult to select a heat shield that simultaneously satisfies the requirements for both cases. Conventionally, a metallic material with electrical conductivity that prioritizes the requirement of one of the above two cases is selected.

BRIEF DESCRIPTION OF THE DRAWINGS

In the accompanying drawings:

FIG. 4A to FIG. 4F are diagrams illustrating deterioration in image quality of MR images attributable to eddy currents that are generated in the heat shield during imaging by the MRI apparatus;

DETAILED DESCRIPTION

Hereinbelow, embodiments of a superconducting magnet and an MRI apparatus will be described by referring to the accompanying drawings.

In one embodiment, a superconducting magnet configured to be used in an MRI apparatus that includes a gradient coil configured to apply a gradient magnetic field to an object, the superconducting magnet comprising: a helium vessel configured to contain a superconducting coil configured to generate a static magnetic field; a vacuum vessel configured to thermally insulate inside of the superconducting magnet by vacuum; and a heat shield configured to be disposed between the helium vessel and the vacuum vessel and reduces radiant heat, wherein: the superconducting magnet is disposed in such a manner that distance between the gradient coil and the object is shorter than distance between the superconducting magnet and the object; among components constituting the heat shield, at least a component of a portion facing the gradient coil is composed by superimposing two layers of metallic materials, the two layers being a first shield layer and a second shield layer; the first shield layer is disposed in such a manner that distance between the gradient coil and the first shield layer is shorter than distance between the gradient coil and the second shield layer; and a metallic material forming the first shield layer is higher in electrical conductivity than a metallic material forming the second shield layer.

(Overall Configuration of MRI Apparatus)

Figure 1:
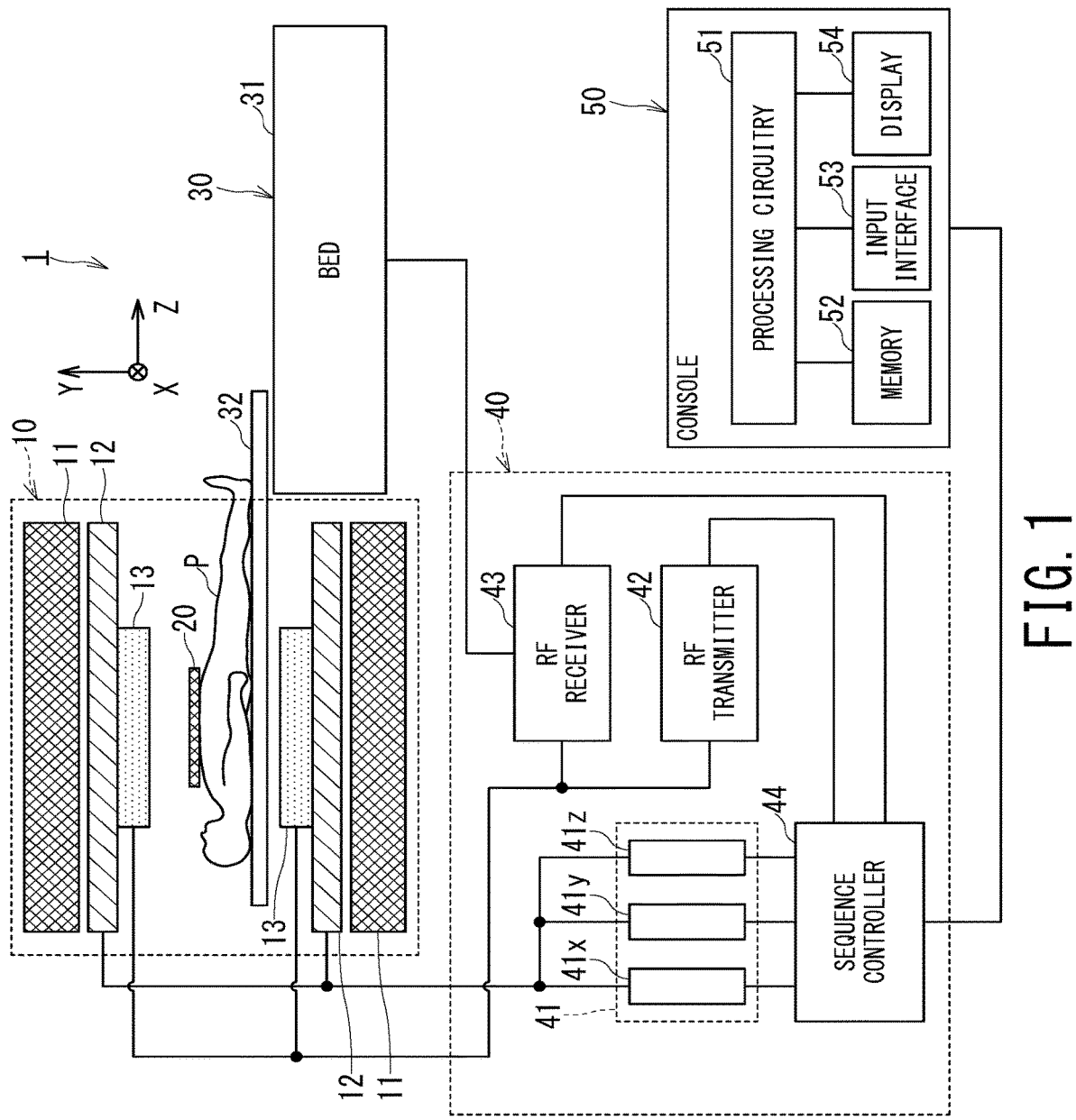
FIG. 1 is a block diagram illustrating a configuration of an MRI apparatus according to one embodiment.

FIG. 1 is a block diagram illustrating an overall configuration of an MRI apparatus 1 according to one embodiment. The MRI apparatus 1 includes a gantry 100, a receiving coil 20, a bed 30, a control cabinet 40, and a console 50. The gantry 10, the receiving coil 20, and the bed 30 are disposed in a shielded room called an examination room, for example. The control cabinet 40 is disposed in a machine room, for example. The console 50 is disposed in a control room, for example.

The gantry 10 includes a superconducting magnet 11, a gradient coil assembly 12, and a transmitting coil 13 (for example, a WB coil or whole body coil 13). The components of the gantry 10 are housed in a generally cylindrical housing.

The superconducting magnet 11 is substantially in the form of a cylinder and generates a static magnetic field inside a bore, which is a space inside the cylindrical structure of the superconducting magnet 11 and is also an imaging region of the object P such as a patient. The superconducting magnet 11 includes superconducting coils 114 inside, and the superconducting coils 114 are cooled down to an extremely low temperature by liquid helium. The superconducting magnet 11 generates a static magnetic field by applying electric currents provided from a static magnetic field power supply (not shown) to the superconducting coils 114 in an excitation mode. Afterward, when the superconducting magnet 11 shifts to a persistent current mode, the static magnetic field power supply is disconnected. Once it shifts to the persistent current mode, the superconducting magnet 11 continues to generate a strong static magnetic field for a long time, for example, over one year.

The configuration of the superconducting magnet 11 will be described below in detail.

The gradient coil assembly 12 is also substantially in the form of a cylinder and is fixed to the inside of the superconducting magnet 11. In other words, the gradient coil assembly 12 is disposed such that the distance between the gradient coil assembly 12 and the object P is shorter than the distance between the superconducting magnet 11 and the object P. The gradient coil assembly 12 is composed of three gradient coils for the respective X-axis, Y-axis, and Z-axis. The three gradient coils generate gradient magnetic fields in the respective directions of the X-axis, Y-axis, and Z-axis by being supplied with gradient magnetic field currents from the respective gradient coil power supplies 41 (41$x$ for the X-axis, 41$y$ for the Y-axis, and 41$z$ for the Z-axis) so as to apply the generated gradient magnetic fields to the object P.

Since eddy-current magnetic fields ascribable to eddy currents, which are inevitably generated along with the generation of gradient magnetic fields, interfere with imaging, an ASGC (Actively Shielded Gradient Coil) for reducing the eddy currents may be used as the gradient coil assembly 12, for example. The ASGC is a gradient coil assembly provided with shield coils, which are installed outside the main coils for forming gradient magnetic fields in the three orthogonal directions of the X-axis, Y-axis, and Z-axis and suppress leakage magnetic fields.

The transmitting coil 13 is also substantially in the form of a cylinder and is disposed inside the gradient coil assembly 12 so as to surround the object P. The transmitting coil 13 applies RF pulses to the object P on the basis of RF pulse transmitted from the RF transmitter 42, and receives MR signals emitted from the object P due to excitation of hydrogen nuclei.

The receiving coil 20 receives MR signals emitted from the object P at a position close to the object P. There are various models of receiving coils 20 depending on an examination portion of the object P, such as the head, the neck, the chest, the spine, the upper limbs, the lower limbs, and the whole body. FIG. 1 illustrates a state in which the receiving coil 20 for the chest is attached to the object P.

The control cabinet 40 includes the above-described gradient magnetic field power supplies 41 (41$x$ for the X-axis, 41$y$ for the Y-axis, and 41$z$ for the Z-axis), an RF transmitter 42, an RF receiver 43, and a sequence controller 44.

In response to the instruction from the sequence controller 44, the gradient magnetic field power supplies 41 (41$x$ for the X-axis, 41$y$ for the Y-axis, and 41$z$ for the Z-axis) supply gradient magnetic field currents to the respective three gradient coils for the X-axis, Y-axis, and Z-axis of the gradient coil assembly 12 so as to generate respective gradient magnetic fields in the X-axis, Y-axis, and Z-axis.

The RF transmitter 42 generates RF pulses based on instructions from the sequence controller 44. The RF transmitter 42 transmits the generated RF pulses to the transmitting coil 13.

The MR signals received by the receiving coil 20 are transmitted to the RF receiver 43. The RF receiver 43 performs AD (Analog to Digital) conversion on the MR signals received by the receiving coil 20 to acquire raw data, and then outputs the raw data to the sequence controller 44.

The sequence controller 44 performs a scan of the object P by driving the gradient coil power supplies 41, the RF transmitter 42, and the RF receiver 43 under the control of the console 50. When the sequence controller 44 receives the raw data from the RF receiver 43 by scan, the sequence controller 44 transmits the raw data to the console 50.

The console 50 includes processing circuitry 51, a memory 52, an input interface 53, and a display 54.

The processing circuitry 51 is a circuit such as a programmable logic device, an ASIC (Application Specific Integrated Circuit), and a processor including a special-purpose or general-purpose CPU (Central Processing Unit) and an MPU (Micro Processor Unit). The programmable logic device includes circuits such as an SPLD (Simple Programmable Logic Device), a CPLD (Complex Programmable Logic Device), and an FPGA (Field Programmable Gate Array), for example. The processing circuitry 51 reads in and executes the programs stored in the memory 41 or directly incorporated in the processing circuitry 51 so as to implement the functions of controlling the operation of the sequence controller 44, performing imaging based on a pulse sequence, and generating MR images.

In addition, the processing circuitry 51 may be configured of single processing circuitry or may be configured as a combination of a plurality of independent processing circuitry elements. In the latter case, a plurality of memories 52 may store the programs corresponding to the respective functions of the plurality of processing circuitry elements or one memory 52 may collectively store the programs corresponding to the functions of all the processing circuitry elements.

The memory 52 includes a recording medium such as a hard disk, an optical disc, and a semiconductor memory device, as exemplified by a ROM (Read-Only Memory) and a flash memory. The memory 52 may include a portable medium such as a USB (Universal Serial Bus) memory and a DVD (Digital Video Disk). The memory 52 stores various processing programs (including application programs and an OS or operating system) to be executed by the processing circuitry 51, data necessary for executing the programs, and medical images. In addition, the OS can include a GUI (Graphical User Interface) that makes extensive use of graphics to display information to the user on the display 54 and allows basic operations to be performed by using the input interface 53.

The input interface 53 includes an input device, which can be operated by a user, and an input circuit to which input signals from the input device are inputted. The input device is achieved by a trackball, a switch, a mouse, a keyboard, a touchpad where input operation can be performed by touching the operation screen, a touchscreen in which a display screen and a touchpad are integrated, a non-contact input device using an optical sensor, and a voice input device, for example. When the input device is operated by the user, the input circuit generates a signal corresponding to the operation, and outputs the generated signal to the processing circuitry 51.

The display 54 is composed of a general display output device such as a liquid crystal display and an OLED (Organic Light Emitting Diode) display. The display 54 displays various information items under the control of the processing circuitry 51.

The console 50 stores the raw data transmitted from the sequence controller 44 in the memory 52 as k-space data under the control of the processing circuit 51. The console 50 generates MR images of the object P by performing reconstruction processing such as inverse Fourier transform on the k-space data stored in the memory 52 under the control of the processing circuitry 51. The console 50 then stores the generated various MR images in the memory 52 under the control of the processing circuitry 51.

(Superconducting Magnet)

Figure 2:
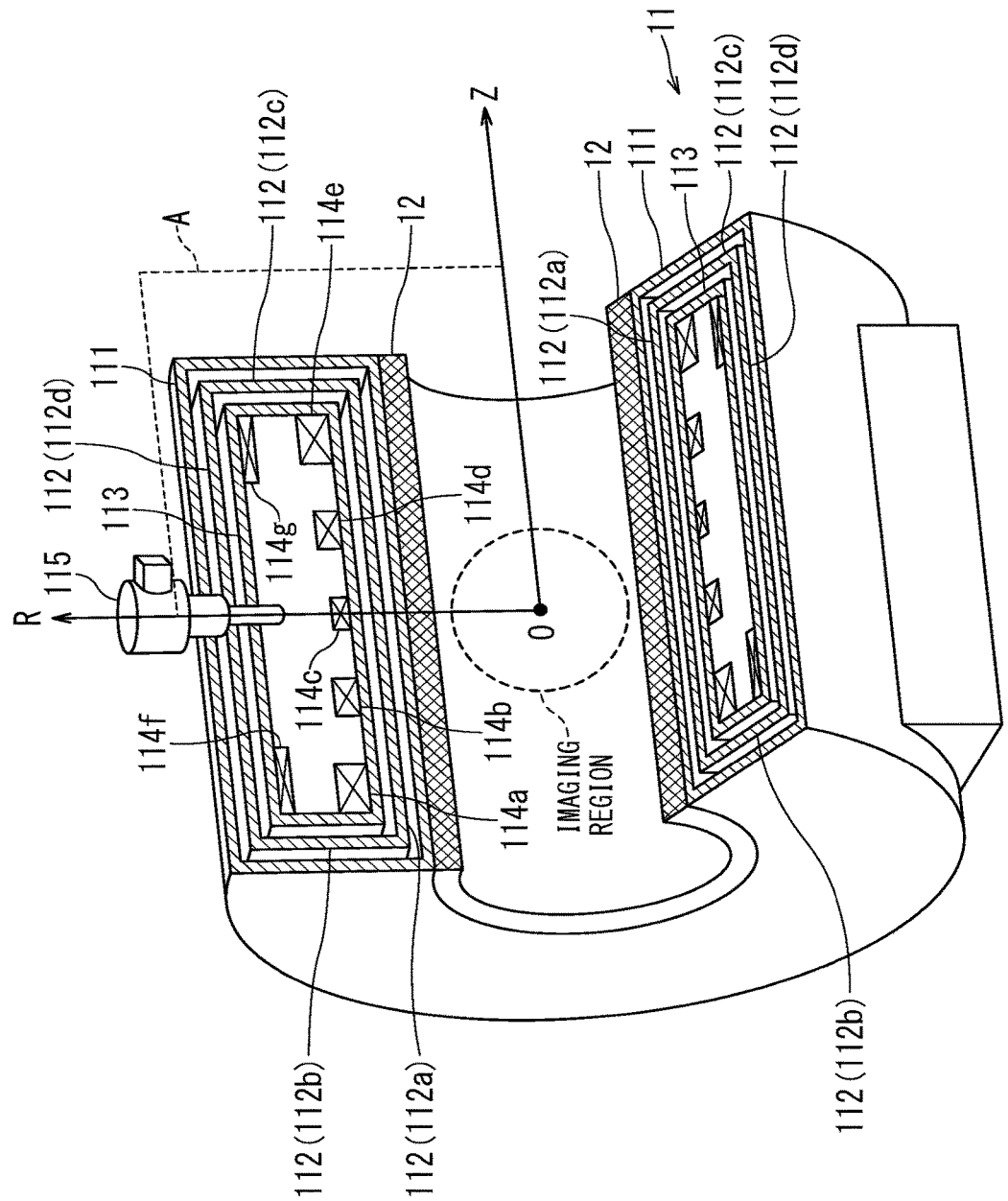
FIG. 2 is a perspective view illustrating an internal configuration of a superconducting magnet according to the embodiment.

FIG. 2 is a perspective view illustrating the internal configuration of the superconducting magnet 11. The superconducting magnet 11 is approximately in a cylindrical shape with the Z-axis as its central axis, and generates a static magnetic field in the bore, which is the space inside the cylindrical structure of the superconducting magnet 11 and serves as the imaging region of the object P. As shown in FIG. 2, the superconducting magnet 11 includes a helium vessel 113, a heat shield 112, and a vacuum vessel 111. The helium vessel 113 contains, for example, seven superconducting coils 114 (114a, 114b, 114c, 114d, 114e, 114f, 114g in FIG. 2). The superconducting coils 114 generate a static magnetic field. The superconducting coils 114 may be composed of main superconducting coils (114a, 114b, 114c, 114d, 114e in FIG. 2) that form the main magnetic fields and shielding superconducting coils (114f and 114g in FIG. 2) for reducing leakage magnetic fields, for example. The number and arrangement of the superconducting coils 114 are not limited to the aspect shown in FIG. 2 but can be changed depending on various conditions.

The helium vessel 113 approximately in a cylindrical shape centered on the Z-axis is provided inside the heat shield 112, and holds the liquid helium. The superconducting coils 114 are provided inside the helium vessel 113 and are cooled down to a cryogenic temperature. Respective winding frames (not shown) wire, arrange, and fix the superconducting coils 114 so as to hold the superconducting coils 114. Note that the superconducting magnet 11 is provided with a cooler 115 for cooling down the liquid helium to a cryogenic temperature.

The heat shield 112 approximately in a cylindrical shape centered on the Z-axis similarly to the helium vessel 113 is provided inside the vacuum vessel 111, and includes the helium vessel 113 inside. In other words, the heat shield 112 is disposed between the vacuum vessel 111 and the helium vessel 113. The heat shield 112 can reduce heat intrusion into the helium vessel 113 due to radiant heat. In order to reduce heat intrusion, the heat shield 112 is generally formed by using a non-magnetic metallic material with high heat transfer performance, as exemplified by an aluminum alloy (hereinafter also referred to as an aluminum material) and a copper alloy (hereinafter also referred to as a copper material).

The configuration of the heat shield 112 will be described below in detail.

The vacuum vessel 111 is approximately in a cylindrical shape centered on the Z-axis similarly to the helium vessel 113 and the heat shield 112, accommodates the helium vessel 113 and the heat shield 112 inside, and thermally insulates the inside of the superconducting magnet 11 by vacuum.

Figure 3:
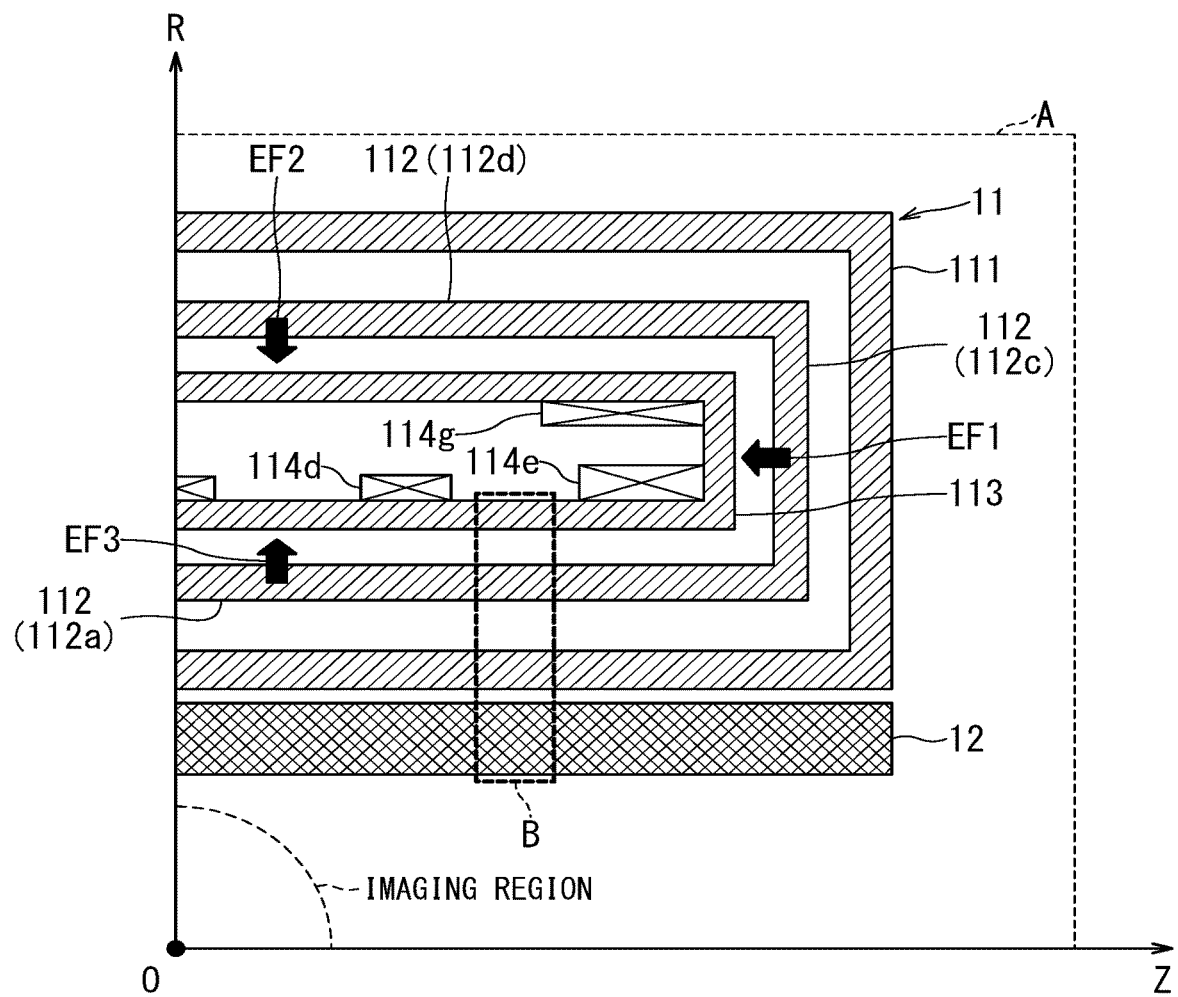
FIG. 3 is an enlarged cross-sectional view of the portion A in FIG. 2 for illustrating electromagnetic force to be generated within a heat shield due to quenching of superconducting coils.

There are conflicting requirements regarding the electrical conductivity of the metallic materials forming the heat shield 112 between the viewpoint of maintaining image quality during imaging by the MRI apparatus 1 and the viewpoint of reducing the influence of a quench when the superconducting coils 114 are quenched. The conflicting requirements will be described by using FIG. 3 and FIG. 4A to FIG. 4F. FIG. 3 is an enlarged cross-sectional view of the portion A in FIG. 2 for illustrating the electromagnetic force generated within the heat shield 112 due to quenching of the superconducting coils 114.

The superconducting coils 114 are quenched in some cases due to an electrical trouble and/or some kind of disturbance that occurs within the coils. When a quench occurs, significantly large electromagnetic force is generated within the heat shield. In detail, when a quench occurs in the superconducting coils 114, the magnetic energy of the superconducting coils 114 is induced into the heat shield 112 by electromagnetic induction, and thereby, electromagnetic force toward the helium vessel 113 is generated in the heat shield 112 as shown by the arrows EF1, EF2, and EF3 in FIG. 3. The electromagnetic force acting on the heat shield 112 at the time of a quench increases corresponding to the induced current induced in the heat shield 112. As the electrical conductivity of the metallic material forming the heat shield 112 increases, the induced current induced in the heat shield 112 also increases.

If this electromagnetic force increases, the heat shield 112 may be damaged, and additional mechanical reinforcement may be required to prevent the damage to the heat shield 112. Even in the case where the heat shield 112 is not damaged, if the rigidity of the heat shield 112 is insufficient, the heat shield 112 may deform and contact the outer vacuum vessel 111 or the inner helium vessel 113. Thus, in order to reduce the electromagnetic force acting on the heat shield 112 when a quench occurs, the metallic material forming the heat shield 112 is preferably to be low in electrical conductivity so as to sufficiently decrease the induced current induced in the heat shield 112. Hence, from the viewpoint of reducing the influence of a quench when the superconducting coils 114 are quenched, a metallic material with low electrical conductivity is desirable for forming the heat shield 112.

During imaging by the MRI apparatus 1, eddy currents are generated in the heat shield 112 due to the operation of the gradient coil assembly 12. FIG. 4A to FIG. 4F are diagrams illustrating deterioration in image quality of MR images attributable to the eddy currents generated in the heat shield 112 during imaging by the MRI apparatus 1.

FIG. 4A, FIG. 4C, and FIG. 4E show a case of a pulse sequence and respectively illustrate a slice selection gradient pulse Gss, a phase encoding gradient pulse Gpe, and a readout gradient pulse Gro. The shape of each gradient pulse is more like a trapezoidal wave rather than a rectangular wave, and an eddy current is generated so as to cancel out the fluctuation in the magnetic field at each rise and fall of the trapezoidal wave.

FIG. 4B, FIG. 4D, and FIG. 4F schematically show a case of the 0-th order component waveform of the eddy-current magnetic field that does not depend on a spatial position. FIG. 4B illustrates the waveform of the eddy-current magnetic field ABss that is generated in response to the slice selection gradient pulse Gss. FIG. 4D illustrates the waveform of the eddy-current magnetic field ABpe that is generated in response to the phase encoding gradient pulse Gpe. FIG. 4F illustrates the waveform of the eddy-current magnetic field ABro that is generated in response to the readout gradient pulse Gro. The eddy currents generated in the heat shield 112 individually form their own eddy-current magnetic fields. The eddy-current magnetic fields affect the imaging space and cause deterioration in image quality of MR images. In order to reduce deterioration in image quality of MR images due to the eddy-current magnetic fields, it is known to finely adjust the gradient pulses to be applied by the gradient coils and to correct the phase of each MR signal by using a composite waveform of the eddy-current magnetic fields, for example.

The time constant at which the eddy-current magnetic field decays with a function approximated by an exponential function can take a value from several ms to about 2000 ms, for example. The plurality of eddy-current magnetic fields generated at the rise and fall of each gradient pulse continue while decaying even after application of each gradient pulse. Each gradient pulse is applied in both positive and negative directions, and the positive and negative eddy-current magnetic fields generated by each gradient pulse are integrated while canceling each other out. Thus, a longer decay time constant of the eddy-current magnetic field has a stronger effect on reducing the influence of the eddy-current magnetic field during acquisition of MR signals. Further, the longer the decay time constant of the eddy-current magnetic field is, the easier it is to understand the decay characteristics, which facilitates correction for reducing deterioration in image quality of MR images, such as fine adjustment of the gradient pulses.

It is known that the higher the electrical conductivity of the metallic material where the eddy current flows is, the longer the decay time constant of the eddy current will be. Thus, from the viewpoint of maintaining image quality during imaging by the MRI apparatus 1, it is preferred that the material of the heat shield 112 is a metallic material with higher electrical conductivity.

As described above, there are conflicting requirements regarding the electrical conductivity of the metallic material forming the heat shield 112 between the case of imaging by the MRI apparatus 1 and the case where the superconducting coils 114 are quenched. Since it is difficult to select a heat shield that satisfies the conflicting requirements, materials selected for forming the heat shield 112 are conventionally a metallic material that prioritizes the requirement of one of the above two requirements or intermediately satisfies both requirements. In this context, according to the heat shield 112 of the embodiment described below, the conflicting requirements for the above-described two cases can be satisfied at the same time.

The configuration of the heat shield 112 according to the embodiment will be described in detail. The heat shield 112 is composed of four heat shield plates including: a first heat-shield plate 112a (i.e., the inner cylinder of the heat shield 112 in FIG. 3) on the side of the gradient coil assembly 12, a second heat-shield plate 112d (i.e., the outer cylinder of the heat shield 112 in FIG. 3) on the opposite side of the gradient coil assembly 12, a third shield plate 112b, and a fourth heat-shield plate 112c. Each of the third shield plate 112b and the fourth heat-shield plate 112c is configured to be perpendicular to the first heat-shield plate 112a and the second heat-shield plate 112d at both ends of the first heat shield plate 112a and the second heat shield plate 112d.

Figure 5:
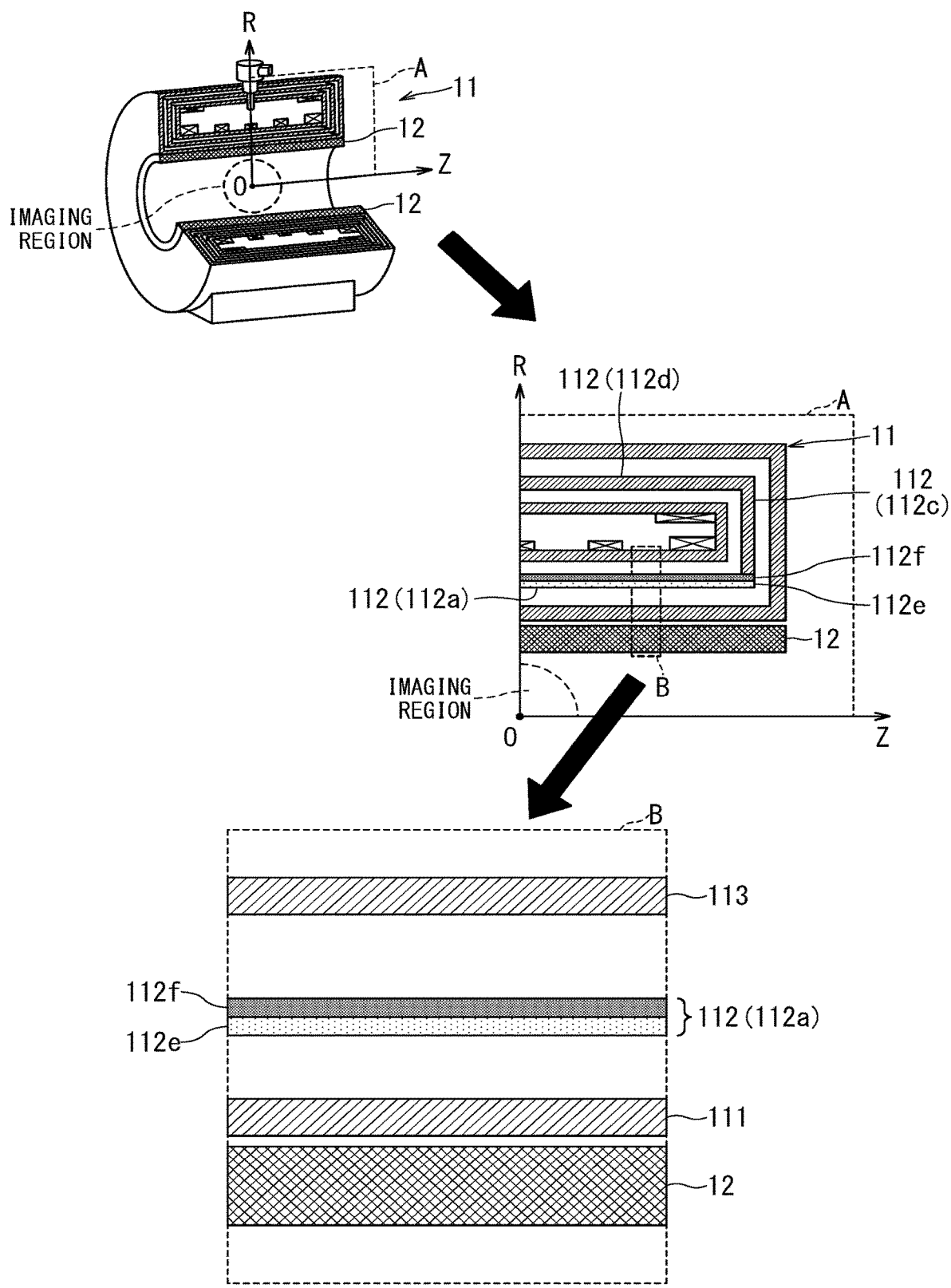
FIG. 5 is an enlarged cross-sectional view of the portion B in FIG. 3 for illustrating a configuration of the heat shield according to the embodiment.

FIG. 5 is an enlarged cross-sectional view of the portion B in FIG. 3. Of the heat shield 112 as shown in FIG. 5, at least the first heat-shield plate 112a facing the gradient coil assembly 12 is configured as superimposition of two layers of metallic materials composed of a first shield layer 112e and a second shield layer 112f. The first shield layer 112e is disposed closer to the gradient coil assembly 12, i.e., closer to the imaging space, than the second shield layer 112f.

Of the heat shield 112, the remaining three heat-shield plates 112b, 112c, 112d, excluding the first heat-shield plate 112a facing the gradient coil assembly 12, may be configured as superimposition of two layers of metallic materials composed of the first shield layer 112e and the second shield layer 112f similarly to the first heat-shield plate 112a. However, this embodiment is not limited to such an aspect. For example, each of the three heat-shield plates 112b, 112c, 112d may be formed as a single layer of a non-magnetic metallic material such as an aluminum material, a copper material, and a stainless-steel material. The metallic material and its thickness of each of the three heat-shield plates 112b, 112c, and 112d, excluding the first heat-shield plate 112a facing the gradient coil assembly 12, can be selected according to desired electrical conductivity and desired mechanical strength.

In order to reduce deterioration in image quality of MR images due to eddy currents generated in the heat shield 112 during imaging as described above, the first heat-shield plate 112a is preferably formed of a metallic material with higher electrical conductivity such that the decay time constant of the eddy-current magnetic field becomes longer. The decay time constant of the eddy-current magnetic field may be about 100 ms, for example. Since the eddy current generated in the first heat-shield plate 112a decreases from the surface of the metallic material toward the inside, the influence of the decay time constant of the eddy-current magnetic field becomes larger on the surface side of the first heat-shield plate 112a, i.e., at a position close to the imaging space. Accordingly, it is preferred to increase the electrical conductivity of the metallic material on the surface side of the first heat-shield plate 112a, i.e., at a position close to the imaging space.

For this reason, in the superconducting magnet 11 of this embodiment, the first heat-shield plate 112a facing the gradient coil assembly 12 is configured such that the electrical conductivity of the metallic material forming the first shield layer 112e is higher than the electrical conductivity of the metallic material forming the second shield layer 112f. Further, the first shield layer 112e with higher conductivity is disposed on the side closer to the imaging space while the second shield layer 112f is disposed on the side farther from the imaging space, and thus, the decay time constant of the eddy current generated in the first shield layer 112e becomes longer. In such a manner, deterioration in image quality of MR images due to the eddy currents can be suppressed.

In addition, there is a positive correlation between electrical conductivity and thermal conductivity in metallic materials, that is, a metallic material with higher electrical conductivity also has higher thermal conductivity. Hence, thermal conductivity is higher in the first shield layer 112e, which is disposed closer to the imaging space, than in the second shield layer 112f. Since the thermal conductivity of the first shield layer 112e is higher, thermal diffusion can be effectively achieved against GCIH (Gradient Coil Induction Heating) that is caused by the eddy currents generated due to the operation of the gradient coil assembly 12.

As described above, when the superconducting coils 114 are quenched, the electromagnetic force toward the helium vessel 113 acts on the heat shield 112. The electromagnetic force acting on the heat shield 112 at the time of a quench becomes larger as the electrical conductivity of the metallic material forming the heat shield 112 is higher. Since the metallic material forming the first shield layer 112e is higher in electrical conductivity than the metallic material forming the second shield layer 112f, the induced current induced in the first shield layer 112e and the electromagnetic force caused by this induced current are larger than the induced current induced in the second shield layer 112f and the electromagnetic force caused by this induced current. For this reason, in the superconducting magnet 11 of this embodiment, the second shield layer 112f is formed of a metallic material such that the second shield layer 112f becomes higher in mechanical strength than the first shield layer 112e. Since the electromagnetic force generated by quenching acts toward the helium vessel 113, by having the second shield layer 112$f$ that has higher mechanical strength than the first shield layer 112$e$, the heat shield 112 as a whole can withstand the large electromagnetic force applied to the first shield layer 112$e$ with higher electrical conductivity. Since the second shield layer 112$f$ closer to the helium vessel 113 is lower in electrical conductivity than the first shield layer 112$e$, such configuration also has the effect on reducing the electromagnetic force acting on the second shield layer 112$f$.

To summarize the above, in the first heat-shield plate 112$a$ facing the gradient coil assembly 12, it is preferred that the metallic material forming the first shield layer 112$e$ closer to the gradient coil assembly 12 is higher in electrical conductivity than the metallic material forming the second shield layer 112$f$ closer to the helium vessel 113. Further, it is preferred that the metallic material forming the second shield layer 112$f$ closer to the helium vessel 113 is higher in mechanical strength than the metallic material forming the first shield layer 112$e$ closer to the gradient coil assembly 12.

For example, the metallic material forming the first shield layer 112$e$ and the metallic material forming the second shield layer 112$f$ can be respectively composed of a first aluminum material and a second aluminum material having different electrical conductivities. In this case, the electrical conductivity of the first aluminum material is preferably higher than the electrical conductivity of the second aluminum material. For example, the first aluminum material is preferably an aluminum material with high aluminum purity, i.e., so-called pure aluminum such as A1050. The second aluminum material is preferably an aluminum material containing magnesium, such as A5083 and A6061. This is because A1050 has higher electrical conductivity than A5083 and A6061 whereas A5083 and A6061 have higher mechanical strength than A1050.

Alternatively, the metallic material forming the first shield layer 112$e$ may be an aluminum material while the metallic material forming the second shield layer 112$f$ may be a stainless-steel material. Generally, the electrical conductivity of an aluminum material is higher than that of a stainless-steel material, and the mechanical strength of a stainless-steel material is higher than that of an aluminum material.

Regarding the respective metallic materials of the first and second shield layers 112$e$ and 112$f$, one layer may be formed of an aluminum material while the other layer may be formed of a copper material. Which has higher electrical conductivity, copper material or aluminum material, depends on its purity. Thus, between the copper material and the aluminum material, the one higher in electrical conductivity forms the first shield layer 112$e$ and the other one lower in electrical conductivity forms the second shield layer 112$f$. Specifically, it can be the combination that the second shield layer 112$f$ is formed of a copper material and the first shield layer 112$e$ is formed of an aluminum material, such as A1050, which has higher electrical conductivity than a copper material. Alternatively, it can be the combination that the first shield layer 112$e$ is formed of a copper material and the second shield layer 112$f$ is formed of an aluminum material, such as A5083 or A6061, which has lower electrical conductivity than a copper material.

Forming the first heat-shield plate 112$a$ into a superimposition or double-layer structure of two different aluminum materials also enables simultaneously satisfying the conflicting requirements regarding electrical conductivity of the metallic materials forming the heat shield 112 in the case where the superconducting coils 114 are quenched and the case where imaging is performed by using the MRI apparatus 1. Similarly, formation of the double-layer structure by layering different metallic materials such as a combination of an aluminum material and a copper material or a combination of an aluminum material and a stainless-steel material can simultaneously satisfy the above-described conflicting requirements for both cases.

In addition, the double-layer structure formed by layering two different metallic materials such as a combination of an aluminum material and a copper material or a combination of an aluminum material and a stainless-steel material can achieve the heat shield 112 with excellent properties in electrical conductivity, thermal conductivity, and mechanical strength that is difficult to be achieved by a superimposition structure of two types of aluminum materials.

Further, the thickness of each of the metallic material forming the first shield layer 112$e$ and the metallic material forming the second shield layer 112$f$ can be optimized on the basis of the mechanical strength and the resistance value. Both thickness of the metallic material forming the first shield layer 112$e$ and thickness of the metallic material forming the second shield layer 112$f$ may be 1 mm or more, for example.

In order to maintain high thermal insulation between the inside and outside of the superconducting magnet 11, appropriate spaces (also called gaps) are provided between the helium vessel 113 and heat shield 112, and between the heat shield 112 and the vacuum vessel 111. The gaps between the respective vessels may be about 10 mm, for example. For feasibility corresponding to the model of MRI apparatus 1 and cost reduction, in some cases, it is preferred to make the gaps between the respective vessels as narrow as possible. Additionally or alternatively, in some cases, it is preferred to make the thickness of each of the metallic materials forming the respective vessels as thin as possible. Thus, it is preferred to have the thickness of the metallic materials forming the heat shield 112 (i.e., the total thickness of the metallic materials forming the first shield layer 112$e$ and the second shield layer 112$f$) as thin as possible, while simultaneously satisfying the conflicting requirements regarding the electrical conductivity of the metallic materials forming the heat shield 112.

The thickness of the second shield layer 112$f$ having low electrical conductivity and disposed on the side of the helium vessel 113 is optimized so as to have sufficient mechanical strength capable of withstanding the electromagnetic force generated at the time of quenching of the superconducting coils 114. In this case, since the electromagnetic force generated in the first shield layer 112$e$ having higher electrical conductivity is larger than the electromagnetic force generated in the second shield layer 112$f$, the mechanical strength sufficient for withstanding this electromagnetic force is required. However, though relatively small, the electromagnetic force is also generated in the second shield layer 112$f$ which has lower electrical conductivity. Hence, the metallic materials forming the first and second shield layers 112$e$ and 112$f$ are preferably optimized on the basis of mechanical strength such that both the first and second shield layers 112$e$ and 112$f$ as a whole can withstand the total electromagnetic force generated in the first and second shield layers 112$e$ and 112$f$.

The thickness of the first shield layer 112$e$, which has higher electrical conductivity and is disposed on the side of the vacuum vessel 111 (i.e., on the imaging space side), is mainly optimized on the basis of the resistance value in such a manner that the decay time constant of the eddy current during imaging becomes equal to or longer than a desired value. It is known that the decay time constant of the eddy current increases as the resistance value of the metallic material decreases. Furthermore, the resistance value of a metallic material varies depending on not only the electrical conductivity of the metallic material but also the thickness of the metallic material. In detail, the resistance value of a metallic material decreases as the electrical conductivity of the metallic material increases. Additionally, the resistance value of a metallic material decreases as the thickness of the metallic material increases. Thus, the resistance value can be optimized by appropriately selecting the material and adjusting the thickness of the metallic material forming the first shield layer 112e such that the decay time constant of the eddy current during imaging becomes equal to or longer than the desired value.

In this manner, the thickness of each of the metallic material forming the first shield layer 112e and the metallic material forming the second shield layer 112f are optimized on the basis of the mechanical strength and the resistance value. Further, the material and thickness of the metallic materials forming the first and second shield layers 112e and 112f may be optimized so as to simultaneously satisfy the condition regarding the gaps between the respective vessels inside the superconducting magnet 11 and the condition regarding manufacturing cost in a well-balanced manner. In addition, the material and thickness of the respective metallic materials forming the first and second shield layers 112e and 112f may be decided such that, within a feasible range in the gaps between the respective vessels inside the superconducting magnet 11, the first and second shield layers 112e and 112f may have optimal mechanical strength and optimal resistance.

The heat shield 112 is formed by metal joining of the first shield layer 112e and the second shield layer 112f. The first shield layer 112e and the second shield layer 112f are superimposed and joined by welding, friction welding, swaging (caulking), screwing, clamping, or shrink fitting, for example.

In the superimposition of the first shield layer 112e and the second shield layer 112f, there may be portions that are not perfectly joined or adhered sufficiently. Additionally, during imaging, the heat shield 112 may vibrate due to the electromagnetic force generated by the eddy currents that are caused by the operation of the gradient coil. Because this vibration may cause contact frictional electrification between the first shield layer 112e and the second shield layer 112f, an electrically insulating material may be disposed between the first shield layer 112e and the second shield layer 112f.

ANOTHER EMBODIMENT

So far, as the MRI apparatus 1 according to the embodiment, a description has been given of the cylindrical MRI apparatus 1 in which the superconducting magnet 11, the gradient coil assembly 12, and the transmitting coil 13 have a generally cylindrical shape. However, the MRI apparatus is not limited to a cylindrical shape but may also be a planer open type MRI apparatus (hereinafter abbreviated as the open MRI apparatus), and the same holds true for the superconducting magnet.

Figure 6:
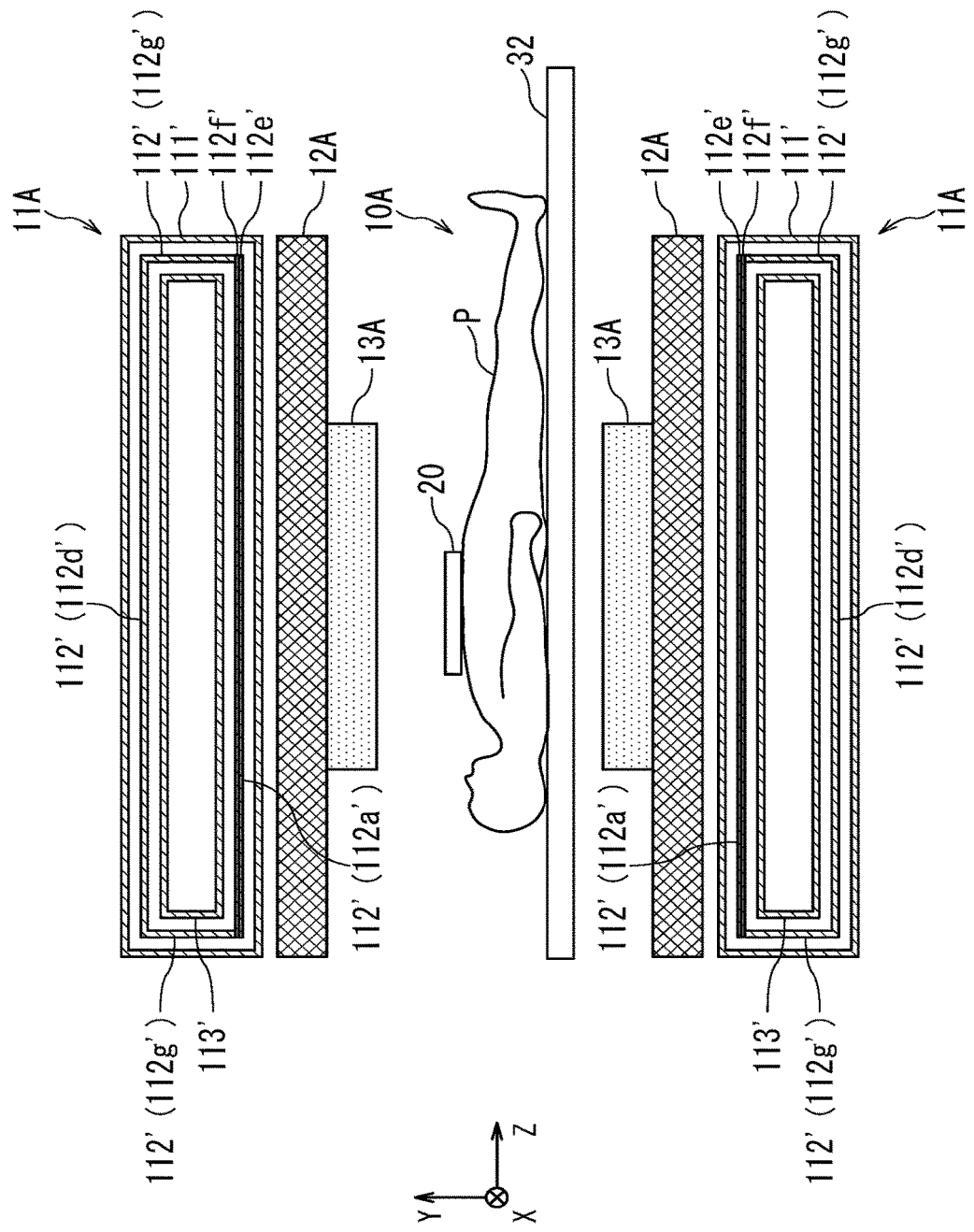
FIG. 6 is a cross-sectional view illustrating a configuration of the MRI apparatus according to another embodiment.

FIG. 6 is a cross-sectional view illustrating a configuration of the open MRI apparatus. As shown in FIG. 6, the open MRI apparatus has a flat circular gantry 10A, and is configured to image the object P in an open space sandwiched between two flat circular superconducting magnets 11A, for example. In this case, except that the two superconducting magnets 11A, two gradient coil assemblies 12A, and two transmitting coils 13A constituting the gantry 10A have a flat circular shape, this open MRI apparatus has a configuration similar to that of the cylindrical MRI apparatus 1.

In the open MRI apparatus, the vacuum vessel 111', the heat shield 112', and the helium vessel 113', which constitute each of the two flat circular superconducting magnets 11A, form a flat circular shape in parallel with the X-Y plane. Each heat shields 112' includes: a first heat-shield plate 112a' on the side near the gradient coil assembly 12A; a heat-shield plate 112d' on the farther side from the gradient coil assembly 12A; and a heat shield plate 112g' perpendicular to the circular outline of both the heat-shield plate 112a' and the heat-shield plate 112d'. As shown in FIG. 6, in the heat-shield plate 112a' on the side near the gradient coil assembly 12A, the first shield layer 112e' is disposed closer to the gradient coil than the second shield layer 112f'. Except that each first shield layer 112e' and each second shield layer 112f' have a flat circular shape, the open MRI apparatus has the same configuration as the cylindrical MRI apparatus 1. In other words, the materials and thicknesses of the two layers of metallic materials forming each first shield layer 112e' and each second shield layer 112f' of the open MRI apparatus are the same as those of the cylindrical MRI apparatus 1.

According to the superconducting magnet and the MRI apparatus of the embodiments described above, the conflicting requirements regarding the electrical conductivity of the metallic materials forming the heat shield can be satisfied, and the influence of the electromagnetic force due to a quench of the superconducting coils can be suppressed while image quality of the generated MR images can be satisfactorily maintained.

While certain embodiments have been described, these embodiments have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the scope of the invention as defined by the appended claims.

What is claimed is:

1. A superconducting magnet configured to be used in an MRI apparatus that includes a gradient coil configured to apply a gradient magnetic field to an object, the superconducting magnet comprising:
　a helium vessel configured to contain a superconducting coil configured to generate a static magnetic field;
　a vacuum vessel configured to thermally insulate inside of the superconducting magnet by vacuum; and
　a heat shield configured to be disposed between the helium vessel and the vacuum vessel and reduce radiant heat, wherein:
　the superconducting magnet is disposed in such a manner that distance between the gradient coil and the object is shorter than distance between the superconducting magnet and the object;
　among components constituting the heat shield, at least a component of a portion facing the gradient coil is composed by superimposing two layers of metallic materials, the two layers being a first shield layer and a second shield layer;
　the first shield layer is disposed in such a manner that distance between the gradient coil and the first shield layer is shorter than distance between the gradient coil and the second shield layer; and a metallic material forming the first shield layer is higher in electrical conductivity than a metallic material forming the second shield layer.

2. The superconducting magnet according to claim 1, wherein a metallic material forming the second shield layer is higher in mechanical strength than a metallic material forming the first shield layer.

3. The superconducting magnet according to claim 1, wherein:
 a metallic material forming the first shield layer is a first aluminum material; and
 a metallic material forming the second shield layer is a second aluminum material different from the first aluminum material.

4. The superconducting magnet according to claim 3, wherein:
 the first aluminum material is A1050; and
 the second aluminum material is A5083 or A6061.

5. The superconducting magnet according to claim 1, wherein:
 a metallic material forming the first shield layer is an aluminum material; and
 a metallic material forming the second shield layer is a stainless-steel material.

6. The superconducting magnet according to claim 1, wherein:
 a metal material forming the first shield layer is one of an aluminum material and a copper material, and a metal material forming the second shield layer is other of the aluminum material and the copper material; and
 of the copper material and the aluminum material, one material with higher electrical conductivity forms the first shield layer and the other material with lower electrical conductivity forms the second shield layer.

7. The superconducting magnet according to claim 1, wherein thickness of a metallic material forming the first shield layer and thickness of a metallic material forming the second shield layer are optimized based on mechanical strength and a resistance value.

8. The superconducting magnet according to claim 1, wherein the first shield layer and the second shield layer are superimposed by any one of welding, friction welding, swaging, screwing, clamping, and shrink fitting.

9. The superconducting magnet according to claim 1, wherein an electrically insulating material is disposed between the first shield layer and the second shield layer.

10. An MRI apparatus comprising: a gradient coil configured to apply a gradient magnetic field to an object; and a superconducting magnet, wherein:
 the superconducting magnet comprises
  a helium vessel containing a superconducting coil configured to generate a static magnetic field,
  a vacuum vessel configured to thermally insulate inside of the superconducting magnet by vacuum, and
  a heat shield disposed between the helium vessel and the vacuum vessel and configured to reduce radiant heat;
 the gradient coil is disposed in such a manner that distance between the gradient coil and the object is shorter than distance between the superconducting magnet and the object;
 among components constituting the heat shield, at least a component of a portion facing the gradient coil is composed by superimposing two layers of metallic materials, the two layers being a first shield layer and a second shield layer;
 the first shield layer is disposed in such a manner that distance between the gradient coil and the first shield layer is shorter than distance between the gradient coil and the second shield layer; and
 a metallic material forming the first shield layer is higher in electrical conductivity than a metallic material forming the second shield layer.

* * * * *